Aug. 10, 1954
F. F. DAUENHAUER
2,685,966
APPARATUS FOR SEPARATING PICKED
HOPS FROM LEAVES AND STEMS
Filed Aug. 16, 1950
3 Sheets-Sheet 1
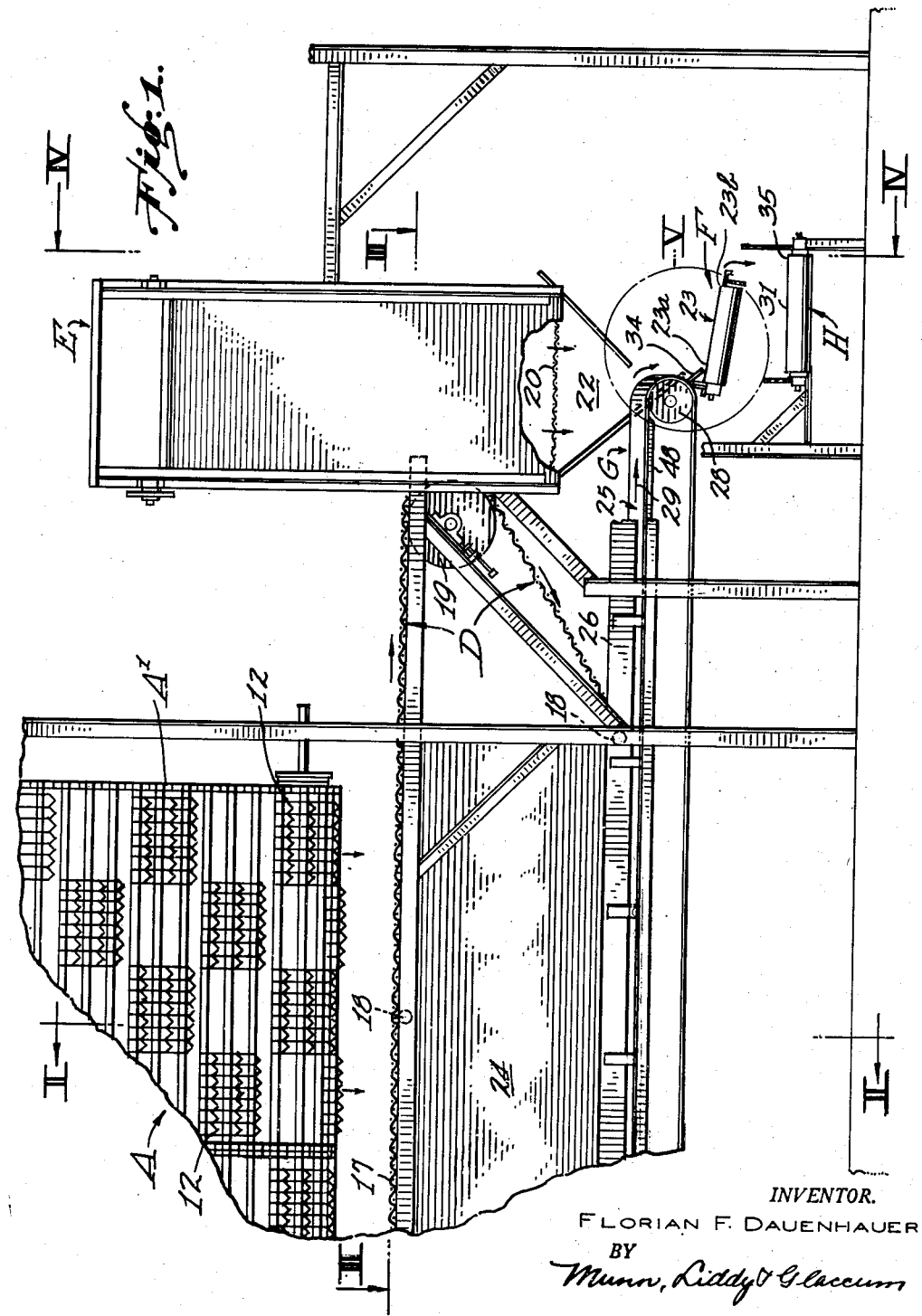
INVENTOR.
FLORIAN F. DAUENHAUER
BY
ATTORNEYS Aug. 10, 1954
F. F. DAUENHAUER
2,685,966
APPARATUS FOR SEPARATING PICKED
HOPS FROM LEAVES AND STEMS
Filed Aug. 16, 1950
3 Sheets-Sheet 2
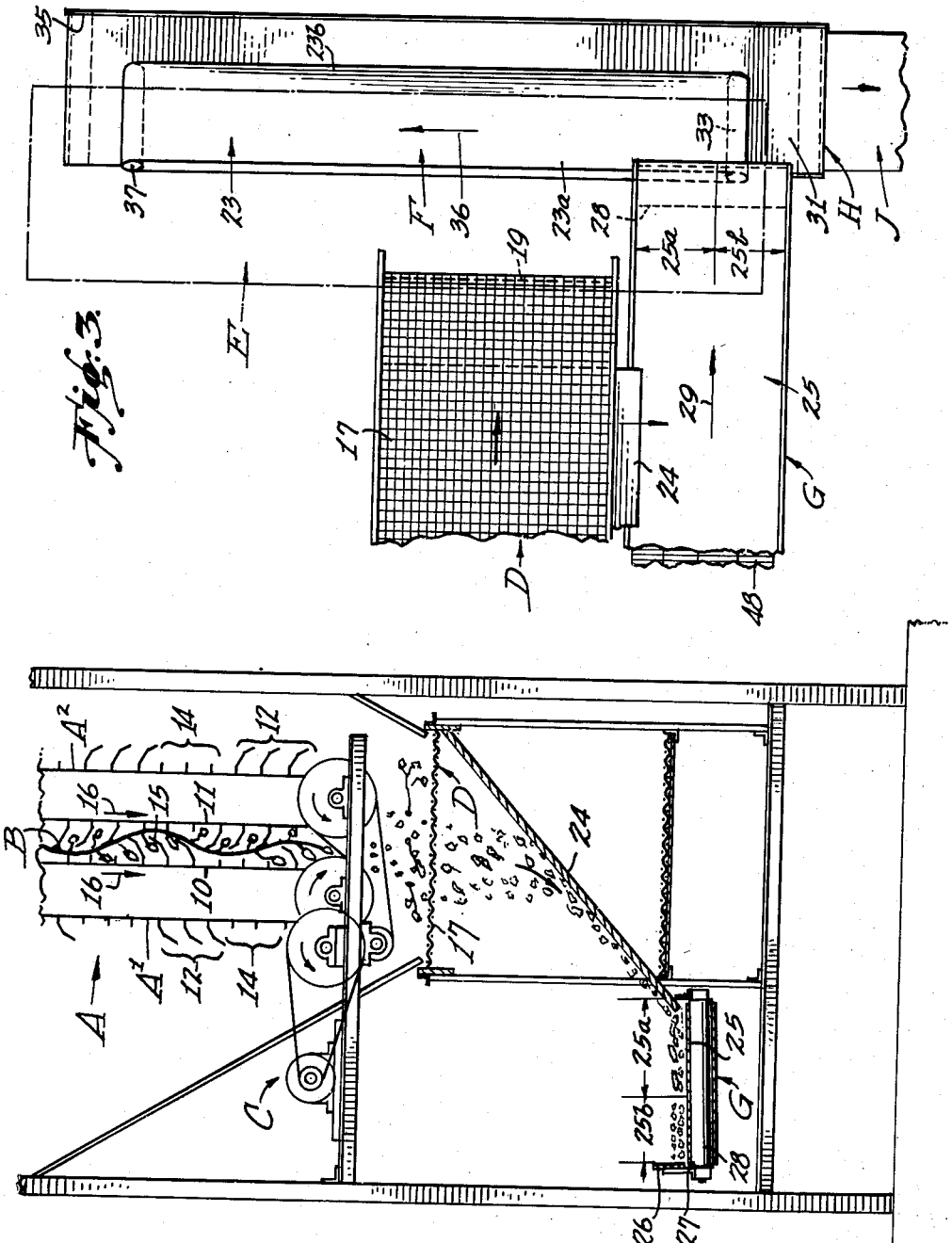
INVENTOR.
FLORIAN F. DAUENHAUER
BY
ATTORNEYS

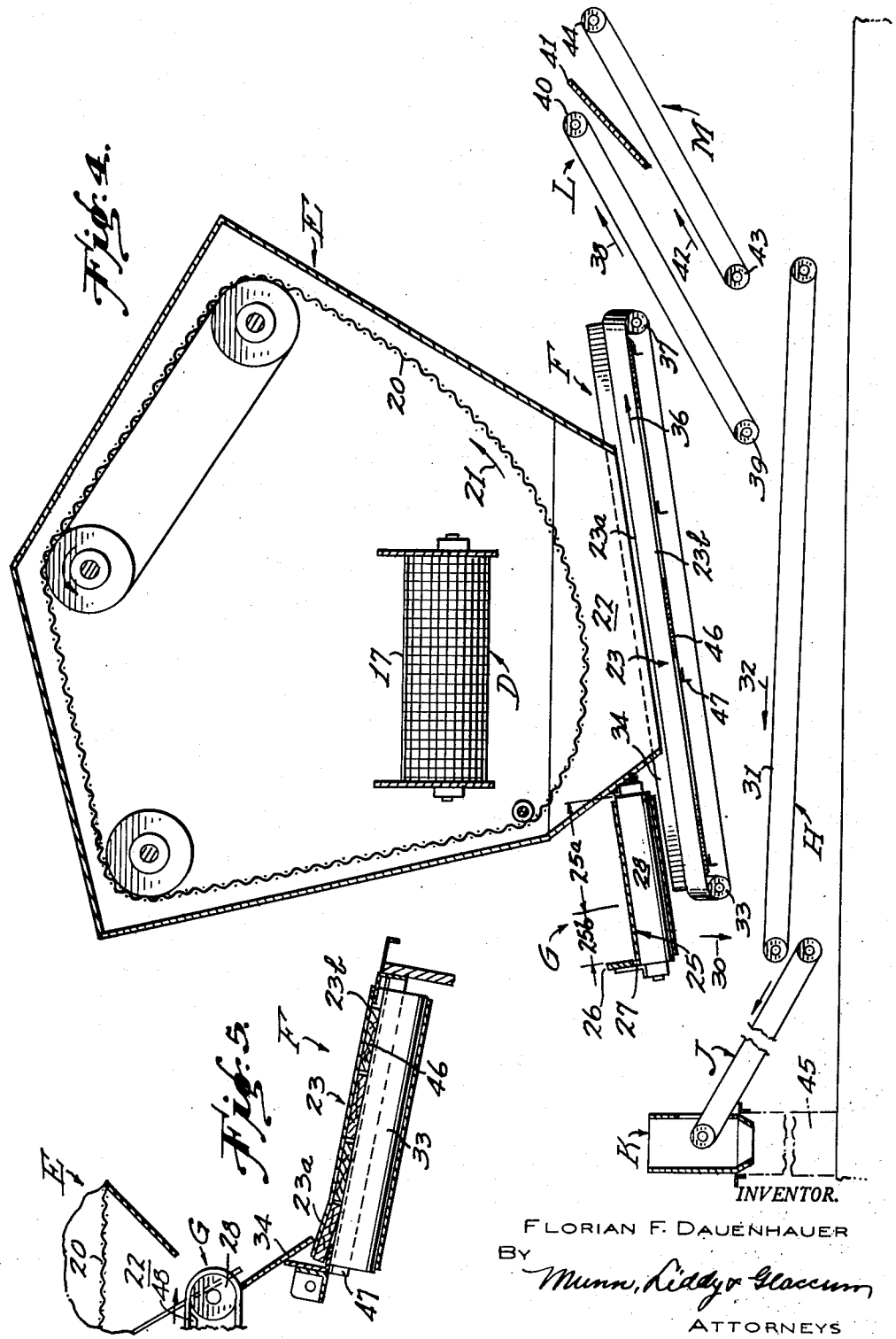

Patented Aug. 10, 1954

2,685,966

UNITED STATES PATENT OFFICE 2,685,966

APPARATUS FOR SEPARATING PICKED HOPS FROM LEAVES AND STEMS

Florian F. Dauenhauer, Santa Rosa, Calif.

Application August 16, 1950, Serial No. 179,723

3 Claims. (Cl. 209—114)

The present invention relates to improvements in an apparatus for separating picked hops from leaves and stems, thereby obtaining cleaned hops, which are free from any undesired parts of the hop vines.

In a copending application, Serial No. 179,722, filed in the United States Patent Office on August 16, 1950, I disclose a method and apparatus for picking hops. Clusters and branches resulting from this picking operation are conveyed to an apparatus for picking hops from branches and clusters and for separating leaves and stems therefrom, disclosed in another copending application, Serial No. 179,724, filed on August 16, 1950.

Both of the apparatus in these two copending applications deliver hops, stems and leaves, which require further separation, to the end that cleaned hops are obtained. The hop-leaf-stem separation is accomplished in the present case.

This separation is effected by utilizing the following principle: Hops, when freed from the vines, will roll down an incline, gathering momentum; whereas, leaves and stems will slide down the incline rather than roll therealong, thus reducing any momentum imparted to the leaves and stems.

An object of this invention is to provide a conveyor, which is inclined laterally or sidewise. The hops, leaves and stems to be separated are discharged upon the conveyor near the higher section thereof. The clean hops will roll to the lower section of the conveyor, while unclean hops, leaves and stems, will be moved along the higher section of the conveyor. The clean hops are conveyed to a sacking device, while the unclean hops are moved from one conveyor to another until all of the leaves and other refuse are separated from the hops.

Other objects and advantages will appear as the specification continues. The novel features of the invention will be set forth in the claims hereunto appended.

Drawings

For a better understanding of my invention, reference should be had to the accompanying drawings, forming part of this application, in which:

Figure 1 is a side elevational view fragmentarily disclosing the hop-picking unit and trommel of my above-identified copending applications; and illustrating portions of the present apparatus for separating hops from leaves and stems;

Figure 2 is a vertical transverse sectional view taken along the line II—II of Figure 1;

Figure 3 is a horizontal plan view taken along the plane III—III of Figure 1;

Figure 4 is an end elevational view of the apparatus as seen from the plane IV—IV of Figure 1, parts being shown in section; and Figure 5 is a longitudinal sectional view of those parts of the apparatus enclosed within the circle V of Figure 1.

While I have shown only the preferred form of my invention, it should be understood that various changes, or modifications, may be made within the scope of the annexed claims without departing from the spirit thereof.

Detailed description

Referring to Figures 1 and 2, I have shown a hop-picking unit indicated generally at A. This unit is covered by my copending application entitled Method and Apparatus For Picking Hops, Serial No. 179,722, filed on August 16, 1950.

As fragmentarily illustrated, this hop-picking unit includes vertically-arranged picking conveyors A1 and A2 which have confronting reaches 10 and 11, respectively, mounted in spaced-apart relation with one another (see Figure 2). Hop vines B are supported from overhead, and are advanced between the confronting reaches 10 and 11. These conveyors have picking fingers 12 arranged thereon in groups, with the groups of fingers on one reach disposed opposite spaces 14 on the other reach. This arrangement forms the vines into wave-like configurations during the hop-picking operation, with hops 15 being picked from both sides of the depending vine. The vine is undulated in first one direction and then the other as the waves are advanced lengthwise of the depending vine.

A drive mechanism designated generally at C in Figure 2 is employed for moving the reaches 10 and 11 downwardly, as suggested by the arrows 16. Hops, clusters, leaves, branches and stems are stripped from the vine, and gravitate onto the upper reach 17 of an endless screen conveyor D. The latter is guided over rollers 18 and a drum 19 and the upper reach will separate the freed hops and petals from the clusters, leaves, branches and stems. The clusters and branches will remain on top of the reach 17 and will be discharged over the drum into the interior of a trommel unit E. The freed hops, petals and pieces small enough to pass through the mesh of the screen D, will gravitate through the upper reach 17 and will drop upon an inclined chute 24, see Figure 2.

The trommel unit forms part of the trommel and branch picker disclosed in my copending application, Serial No. 179,724 filed on August 16, 1950. It includes a screen 20 that is driven in the direction of the arrow 21 shown in Figure 4. Hops, stems and leaves will pass through the mesh of this screen and gravitate downwardly through the discharge opening 22 at the bottom of the trommel, falling onto the upper reach 23 of a laterally-inclined transverse conveyor F.

Individual hops, stems and leaves that pass through the upper reach 17 of the endless conveyor D, will be deflected by the inclined chute 24 onto the upper reach 25 of a laterally-inclined longitudinal conveyor G, see Figure 2. In both Figures 1 and 2, the conveyor G is illustrated as extending along one side of the hop picking unit A.

Referring to Figure 2, the leaves that drop through the mesh of the screen D upon the chute 24 will not roll down the incline, but will slide down. Thus the momentum of the leaves will be reduced, and they will settle on the higher section 25a of the conveyor reach 25. However, the freed hops will roll down the inclined chute 24, gathering momentum, and many of them will gravitate onto the lower section 25b of the reach 25. Of course, some of the hops will become mixed with the leaves on the higher section 25a of the conveyor G. Thus a partial separation of hops from leaves is accomplished on the laterally-inclined conveyor G.

It will be noted that a side board 26 extends lengthwise along the lower section 25b of the conveyor G to prevent the hops from rolling laterally off the lowermost edge 27 of this upper conveyor reach. This conveyor is trained around a drum 28, and the upper reach 25 is advanced in the direction of the arrow 29 (see Figures 1 and 3).

The finished hops being advanced along the lower section 25b are discharged over the drum 28, and drop in the manner suggested by the arrow 30 in Figure 4 directly upon a final pick-up transversely-arranged conveyor H. The upper reach 31 of this conveyor is moved in the direction of the arrow 32 in Figure 4. Accordingly, these finished hops will be delivered to an elevating conveyor J leading to a sacking device K.

As illustrated in Figures 3 and 4, the conveyors F and G are arranged at right angles relative to one another, with these conveyors only partially overlapping. The lower drum 33 of the conveyor F is placed below the conveyor G in such a position that uncleaned hops and leaves being discharged from the higher section 25a of the conveyor G will fall onto the higher section 23a of the laterally-inclined conveyor F.

An inclined chute 34 is provided for guiding the uncleaned hops, stems and leaves onto the higher section 23a of the conveyor reach 23 (see Figures 1, 4 and 5). It will be noted that edge 35 of the transverse conveyor H is disposed beyond the lowermost edge 23b of the conveyor F. Thus as the conveyor reach 23 is advanced in the direction of the arrow 36, hops will be freed from the leaves and stems, and will drop over the lower edge 23b. Also, some of the hops dropping from the higher conveyor section 25a will be freed from leaves as they strike the conveyor F, and will roll onto the conveyor H.

Leaves and unfinished hops that are discharged over the upper drum 37 of the transverse conveyor F are dropped upon the mid-portion of a longitudinally-inclined separating conveyor L, which is advancing in the direction of the arrow 38 in Figure 4. Although this conveyor is inclined upwardly, it is not inclined laterally. Finished hops will roll downwardly over the lower drum 39 of the conveyor L, and will be picked up by the conveyor H. However, unfinished hops, stems and leaves will be carried upwardly by the conveyor L, discharging over the upper drum 40 of the conveyor L.

Upon discharging leaves, stems and hops over the drum 40, an inclined chute 41 will direct them to the mid-portion of another longitudinally-inclined separating conveyor M. This conveyor is advanced in the direction of the arrow 42, and is inclined downwardly to a lower drum 43. Freed hops will roll downwardly over the drum 43, and will be picked up by the conveyor H. Leaves and other refuse are discharged over an upper drum 44 to a stock pile or otherwise carried away.

It is pointed out that any dropping of leaves and hops from one conveyor to another will tend to separate the hops from the leaves. This dropping action takes place between the incline chute 24 and the longitudinal conveyor G; between the conveyors G and F, F—L, and L—M. The final pick-up conveyor H receives hops from the conveyors G, F, L and M, and delivers them to the conveyor J leading to the sacking device K, where the hops are placed in sacks 45. The conveyors L and M have been omitted from Figure 3 for the purpose of clarity.

In order to give a firm foundation to the upper reach 23 of the conveyor F, I provide a plurality of stationary boards 46, which extend lengthwise underneath this reach. These boards are supported by angle irons 47, or the like, arranged at intervals. Similar boards 48 are provided beneath the upper reach 25 of the conveyor G for the same purpose (see Figure 1).

*Summary of operation*

The operation of my apparatus for separating picked hops from leaves and stems is summarized briefly as follows:

Hop vines B are advanced between the confronting reaches 10 and 11 of the picking conveyors A1 and A2, respectively, in the manner shown in Figure 2. Individual hops, clusters, branches and stems are removed from the suspended vines by the downwardly-moving fingers 12, and drop onto the upper reach 17 of the endless screen conveyor D.

The mesh of the screen D is sufficiently large to allow individual hops, stems and leaves to pass therethrough, while clusters and branches are conveyed over the end drum 19 for discharge into the interior of the trommel unit E. The rotating screen 20 in the latter will allow hops to drop directly upon the higher section 23a of the transverse conveyor F.

At the same time, hops and leaves will drop through the screen D, and will be guided by the inclined chute 24 to the higher section 25a of the laterally-inclined conveyor G. Individual hops will roll to the lower section 25b of the conveyor reach 25, while leaves and other hops will be deposited on the upper section 25a.

As the conveyor G is advanced, the individual hops being carried forward by the lower section 25b will be discharged upon the final pick-up conveyor H. This may be termed the "first stage" of hop separation. These hops will be transferred to the elevating conveyor J and moved to the sacking device K.

Meanwhile leaves and other hops are being transferred from the higher section 25a of the conveyor G to the higher section 23a of the laterally-inclined conveyor F. The hops moving along the upper reach 23 will have a tendency to separate from the leaves and stems, rolling laterally over the lowermost edge 23b onto the final pick-up conveyor H. This may be referred to as the "second stage" of hop separation.

Leaves, stems and unfinished hops are carried over the upper drum 37 of the conveyor F, and are dropped onto the longitudinally-inclined separating conveyor L. This will result in additional hops being freed, which will roll downwardly onto the conveyor H, constituting the "third stage" of hop separation. In a like manner, leaves, stems and unfinished hops will be discharged over the upper drum 40 of the conveyor L, slide down the inclined chute 41, and drop onto the longitudinally-inclined separating conveyor M for the "fourth stage" of hop separation. By this time, the remaining hops will roll to the final pick-up conveyor H, and the refuse material will be conveyed over the upper drum 44 of the conveyor M for disposal.

I claim:

1. In an apparatus for separating picked hops from leaves and stems: a laterally-inclined conveyor having a reach defining higher and lower sections; means for delivering the hops at one speed and the leaves and stems at a slower speed to the higher section of the conveyor; the lateral inclination of the conveyor cooperating with said means for permitting the hops to roll to the lower section of the conveyor, while the leaves, other hops and stems are retained on the higher reach section during advancement of the conveyor; this conveyor having a discharge end; a pick-up conveyor positioned below and extending at an angle to the first-named conveyor to receive hops being discharged from the lower section of the first-named conveyor; and a second laterally-inclined conveyor extending in the same direction as the pick-up conveyor and being disposed thereabove and also having a reach defining higher and lower sections; the higher section of the first-named conveyor discharging hops, leaves and stems upon the higher section of the second laterally-inclined conveyor; the lateral inclination of the latter conveyor being such that hops will roll down to the lower side of the second laterally-inclined conveyor, while leaves, stems and other hops will be retained on the higher section thereof; said second laterally-inclined conveyor being interposed between the first-named conveyor and the pick-up conveyor, and disposed clear of a hop-dropping zone provided between the lower section of the first-named conveyor and the pick-up conveyor.

2. In an apparatus for separating picked hops from leaves and stems: a laterally-inclined conveyor having a reach defining higher and lower sections; means for delivering the hops at one speed and the leaves and stems at a slower speed to the higher section of the conveyor; the lateral inclination of the conveyor cooperating with said means for permitting the hops to roll to the lower section of the conveyor, while the leaves, other hops and stems are retained on the higher reach section during advancement of the conveyor; this conveyor having a discharge end; a pick-up conveyor positioned below and extending at an angle to the first-named conveyor to receive hops being discharged from the lower section of the first-named conveyor; and a second laterally-inclined conveyor extending in the same direction as the pick-up conveyor and being disposed thereabove and also having a reach defining higher and lower sections; the higher section of the first-named conveyor discharging hops, leaves and stems upon the higher section of the second laterally-inclined conveyor; the lateral inclination of the latter conveyor being such that hops will roll down to the lower side of the second laterally-inclined conveyor, while leaves, stems and other hops will be retained on the higher section thereof; said second laterally-inclined conveyor being interposed between the first-named conveyor and the pick-up conveyor, and disposed clear of a hop-dropping zone provided between the lower section of the first-named conveyor and pick-up conveyor; the lower section of the second laterally-inclined conveyor having a lower lateral edge over which freed hops will be discharged; the pick-up conveyor being offset laterally relatively to said second laterally-inclined conveyor and having a portion thereof positioned to receive the hops as they are discharged over said lower lateral edge of the second laterally-inclined conveyor directly to the pick-up conveyor.

3. In an apparatus for separating picked hops from leaves and stems: a laterally-inclined conveyor having a reach defining higher and lower sections; means for delivering the hops, leaves and stems to the higher section of the conveyor; the lateral inclination of the conveyor being sufficient to cause hops to roll to the lower section thereof, while the leaves, other hops and stems are retained on the higher reach section during advancement of the conveyor; this conveyor having a discharge end; a pick-up conveyor extending at an angle to the first-named conveyor and positioned to receive hops being discharged from the lower section of the first-named conveyor; and a second laterally-inclined conveyor extending in the same direction as the pick-up conveyor and being disposed thereabove, and also having a reach defining higher and lower sections; the higher section of the first-named conveyor discharging hops, leaves and stems upon a portion of the higher section of the second laterally-inclined conveyor; the lateral inclination of the latter conveyor being such that hops will roll down to the lower side of the second laterally-inclined conveyor, while leaves, stems and other hops will be retained on the higher section thereof; the second laterally-inclined conveyor having a discharge end; and a longitudinally-inclined hop-separating conveyor having a portion arranged to receive hops, leaves and stems from the discharge end of the second laterally-inclined conveyor; this longitudinally-inclined hop-separating conveyor extending in the same direction as the second laterally inclined conveyor and having a lower end positioned over the pick-up conveyor and over which finished hops roll and are discharged onto the pick-up conveyor.

References Cited in the file of this patent

UNITED STATES PATENTS

| Number | Name | Date |
| --- | --- | --- |
| 541,431 | Easton | June 18, 1895 |
| 1,253,875 | Passer | Jan. 15, 1918 |
| 1,348,139 | Horst | July 27, 1920 |
| 2,376,128 | Dauenhauer | May 15, 1945 |
| 2,468,639 | Sample | Apr. 26, 1949 |
| 2,475,823 | Dauenhauer | July 12, 1949 |